Sept. 22, 1970    W. LANG    3,530,317
ELECTRONIC PULSE GENERATOR
Filed Nov. 5, 1968
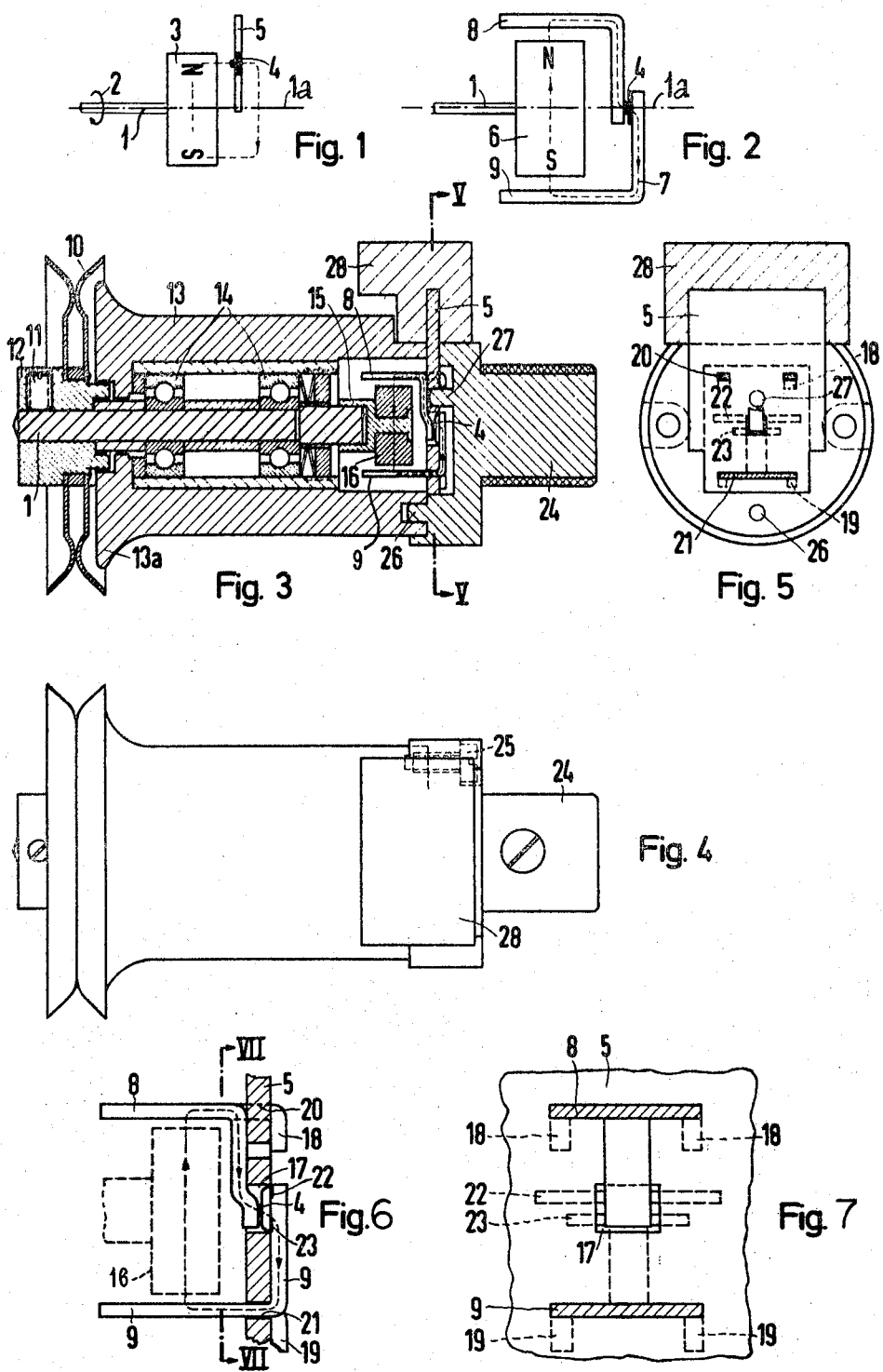

United States Patent Office 3,530,317
Patented Sept. 22, 1970

3,530,317
ELECTRONIC PULSE GENERATOR
Walter Lang, Nuremberg, Germany, assignor to Siemens Aktiengesellschaft, a corporation of Germany
Filed Nov. 5, 1968, Ser. No. 773,534
Claims priority, application Germany, Nov. 11, 1967, S 112,795
Int. Cl. H01c 7/16
U.S. Cl. 310—10      8 Claims

ABSTRACT OF THE DISCLOSURE

An electronic pulse generator produces a number of pulses proportional to the angle of rotation of a shaft. Part of the shaft is magnetized to produce a magnetic field and a Hall probe is fixedly mounted on a fixed conductor plate adjacent the magnetized part of the shaft in the magnetic field. A printed circuit on the conductor plate is electrically connected to the Hall probe and ferromagnetic baffle sheets mounted on the conductor plate direct the magnetic field to the Hall probe.

DESCRIPTION OF THE INVENTION

The present invention relates to an electronic pulse generator. More particularly, the invention relates to an electronic pulse generator for producing a number of pulses proportional to the angle of rotation of a shaft and thereby measuring the length of yarn or thread, or the like. In the pulse generator of the present invention, a magnetic system which rotates with the shaft effects a stationarily mounted Hall probe.

In known electronic pulse generators, a disc or wheellike member of non-magnetic material is securely affixed to the shaft of suitable apparatus. In the peripheral or circular surface of the disc, a plurality of equiangularly spaced radially extending bores are provided and a small permanent magnet is positioned in each of said bores. Instead of being provided in the peripheral surface of the disc, the bores may be formed in one of the planar faces of said disc near the circumference thereof, extending in axial directions. In each case, the permanent magnets mounted in the bores alternate in their directions of magnetization, so that a North pole is always adjacent a South pole. A stationary Hall device, generator or probe is positioned adjacent the disc in the magnetic fields produced by the magnets mounted on said disc. When the disc rotates with the shaft, the Hall probe produces an alternating voltage which is proportional to the angle of rotation of the disc, and therefore of the shaft. A magnetic system of this type is difficult and expensive to manufacture, since its manufacture requires many operational steps. Thus, for example, the individual permanent magnets must be magnetized prior to their installation in the bores of the disc. The magnets must be tightly secured in the bores so that they will not be ejected due to centrifugal force, particularly when the bores extend radially from the peripheral surface of the disc.

Another known type of electronic pulse generator is utilized with an electrical meter having a rotor. The magnetic system of the pulse generator rotates with the rotor of the electrical meter. The magnetic system of such pulse generator is a crown magnet which is set in a cup-shaped carrier. A Hall generator is positioned adjacent the magnetic system and is mounted upon a ferrite ring which functions as the magnetic yoke. This type of pulse generator is very satisfactory, especially when a greater number of pulses has to be produced for each rotation of the shaft. The crown magnet and the cup-shaped carrier constitute a relatively large mass, however, so that the aforedescribed pulse generator is practically useless with apparatus for measuring the length of yarn, thread, or the like, where the rotating parts must have very small moments of inertia.

The principal object of the present invention is to provide a new and improved electronic pulse generator.

An object of the present invention is to provide an electronic pulse generator with a small moment of inertia.

An object of the present invention is to provide an electronic pulse generator which is simple in structure and simple and inexpensive to manufacture.

An object of the present invention is to provide an electronic pulse generator which overcomes the disadvantages of known electronic pulse generators.

An object of the present invention is to provide an electronic pulse generator which eliminates adverse effect of axial play of the shaft on Hall generator.

An object of the present invention is to provide an electronic pulse generator which is safe in operation.

An object of the present invention is to provide an electronic pulse generator which functions with efficiency, effectiveness and reliability.

In accordance with the present invention, the Hall probe is positioned adjacent the magnetic system on a conductor plate which preferably has a printed circuit thereon connected to the Hall probe. The simplest construction entails the provision of magnetization of the end of the shaft or of a magnetic member affixed to the end of the shaft in the shape of an arc so that the field lines of the magnetic field emerge from the magnetic system approximately coaxially with the shaft. Due to the unavoidable axial play of the shaft, the signals produced by the Hall probe may fluctuate somewhat in magnitude. Such axial play must be controlled to specific tolerances in order to permit the Hall probe to produce specific pulses. In certain circumstances, the control of axial play may involve considerable intricacy and expense.

In accordance with the present invention, the difficulties created by axial play of the shaft are eliminated by radial magnetization of the end of the shaft or of a magnetizable member affixed to the end of the shaft, and by guiding the radially emerging field lines of the produced magnetic field to the Hall generator via ferromagnetic baffle sheets. This prevents any axial play of the shaft from having an adverse effect on the magnitude of the Hall voltages produced by the Hall generator. The ferromagnetic baffle sheets are preferably affixed to the conductor plate in a manner in which they retain their configuration The entire apparatus, including the shaft, the conductor plate, the Hall generator and the baffle sheets, is preferably housed in a housing. The conductor plate may be affixed to the housing by a bolted lid or cover. The printed circuit on the conductor plate permits the terminals of the Hall probe to be led to the outside of the housing without connecting wires and the power supply may be connected to said Hall probe via a connector plug, thereby improving the operating safety of the pulse generator to a considerable extent.

In accordance with the present invention, an electronic pulse generator for producing a number of pulses proportional to the angle of rotation of a shaft comprises magnetic means on the shaft rotating with the shaft for producing a magnetic field. A Hall probe is fixedly mounted on a fixed conductor plate adjacent the magnetic means in the magnetic field. A printed circuit on the conductor plate is electrically connected to the Hall probe.

The magnetic means is radially magnetized in a manner whereby the field lines of the magnetic field emerge from the magnetic means substantially radially from the shaft. Ferromagnetic baffle sheets direct the magnetic field to the Hall probe. An outside power connection for the Hall probe is electrically connected to the Hall probe and is mounted on the conductor plate. The ferromagnetic baffle sheets have a specific configuration and the conductor plate comprises means for mounting the baffle sheets in a manner whereby they retain their configuration. Each of the ferromagnetic baffle sheets comprises a shaft metal member bent at an angle.

A housing is provided for housing the shaft, the conductor plate, the Hall probe and the baffle sheets. Part of the shaft extends outside the housing. A peripherally notched yarn wheel is coaxially affixed to the shaft outside the housing for rotation with the shaft. A bulging flange is formed in the housing adjacent and extending under the periphery of the yarn wheel.

In order that the present invention may be readily carried into effect, it will now be described with reference to the accompanying drawing, wherein:

FIG. 1 is a schematic diagram of a Hall device in a magnetic system which is magnetized in the shape of an arc;

FIG. 2 is a schematic diagram illustrating the basic principle of the present invention;

FIG. 3 is a view, partly in section, of an embodiment of the electronic pulse generator of the present invention, as utilized with a yarn wheel;

FIG. 4 is a top view of the embodiment of FIG. 3;

FIG. 5 is a view, partly in section, taken along the lines V—V of FIG. 3;

FIG. 6 is a view, partly in section, of the ferromagnetic baffle sheets of FIG. 3, on an enlarged scale; and FIG. 7 is a view, partly in section, taken along the lines VII—VII of FIG. 6.

In the figures, the same components are identified by the same reference numerals.

In FIG. 1, a shaft 1, having an axis 1a rotates in the direction of an arrow 2. A disc-shaped or wheel-like magnet 2 is affixed to the end of the shaft 1 and rotates therewith. The magnet 3 is magnetized in the shape of an arc in a manner whereby the field lines of the magnetic field produced thereby, one of which lines is indicated by a broken line, emerge from said magnet approximately coaxially with the shaft. A Hall device, generator of probe 4 is positioned in the magnetic field produced by the magnet 3. The Hall device 4 is mounted on a fixed conductor plate 5.

A printed circuit is provided on the conductor plate 5 in electrical connection with the Hall generator 4. This permits the terminals of the Hall probe 4 to be led out without the need for electrical connecting wires or conductors and permits an outside power supply to be provided via a connector plug thereby facilitating the mounting of the equipment and considerably improving the safety and reliability thereof.

In FIG. 2, a magnet 6 is affixed to the shaft 1 and rotates therewith. The magnet 6 is radially magnetized in a manner whereby the field lines of the magnetic field produced by said magnet emerge substantially radially from the shaft 1. In accordance with the present invention, a pair of ferromagnetic baffle sheets 8 and 9 are provided for guiding the field lines of the magnetic field produced by the magnet 6, one of which lines is shown by the broken line 7, to the Hall probe 4. The Hall probe 4 is mounted on the conductor plate 5 (not shown in FIG. 2, but shown in FIGS. 3 and 5 to 7). The ferromagnetic baffle sheets 8 and 9 permit the Hall probe 4 to produce Hall voltages or output signals of substantially equal magnitude even when there is considerable axial play of the shaft 1.

FIG. 3 shows the pulse generator of the present invention as utilized with apparatus for measuring the length of yarn or thread, or the like. The shaft 1 is rotatably mounted in a housing 13 by any suitable means such as, for example, ball bearings 14, and is secured in said housing in radial and axial directions by any suitable means such as, for example, tubular spacers (not shown in the figure). Part of the shaft 1 extends outside the housing 13.

A peripherally notched yarn wheel 10 is coaxially affixed to the shaft 1 outside the housing 13 for rotation with said shaft. The yarn wheel 10 may be affixed to the shaft 1 by any suitable means such as, for example, a bolt 11 threaded through an aperture which extends radially through the hub 12 of said yarn wheel. The yarn, thread, or the like, which is not shown in the figures, moves in contact with the yarn wheel 10 and said yarn wheel is constructed in a manner whereby there is no slippage between said yarn and said yarn wheel. The number of revolutions or the extent of rotation of the shaft 1 is therefore proportional to the length of the yarn moving in contact with the yarn wheel 10.

A bulging flange 13a is formed in the housing 13 adjacent and extending under the periphery of the yarn wheel 10. The flange 13a is provided and positioned in the aforedescribed manner in order to prevent the yarn from slipping between the yarn wheel 10 and the housing 13 during the positioning of said yarn or in the event of a separation of said yarn.

A permanent magnet 16 of substantially annular configuration is affixed to the end of the shaft 1 in the housing 13. The magnet 16 is affixed to an end portion 15 of the shaft 1 and is radially magnetized in the manner of the magnet 6 of FIG. 2. The ferromagnetic baffle sheets 8 and 9 are mounted on the conductor plate 5 in the housing 13. Each of the baffle sheets 8 and 9 comprises a sheet metal member which is bent at an angle so that it is of essentially L-shaped configuration. The baffle sheets 8 and 9 are preferably punched from a large ferromagnetic sheet.

The conductor plate 5 has openings 20 and 21 (FIGS. 5 and 6) formed therethrough in order to mount the baffle sheets 8 and 9 in a manner whereby they retain their configuration. Thus, punched ears 18 (FIGS. 5, 6 and 7) extending from the baffle sheet 8 are passed through the openings 20 formed through the conductor plate 5 and are bent downward on the other side of said conductor plate. Punched ears 19 (FIGS. 5, 6 and 7) extending from the baffle sheet 9 are passed through the openings 21 formed through the conductor plate 5 and are bent downward on the other side of said conductor plate. The ferromagnetic baffle sheets 8 and 9 are thereby affixed to the conductor plate 5 in a manner whereby they retain their configuration.

The ferromagnetic baffle sheets 8 and 9 are so positioned (FIGS. 3 and 6) that the baffle sheet 8 is over the permanent magnet 16 and adjacent one side of the Hall device 4 and the baffle sheet 9 is under said magnet and adjacent the opposite side of said Hall device. The Hall probe 4 is fixedly mounted on the fixed conductor plate 5 in the housing 13. An opening 17 (FIGS. 6 and 7) is formed in the conductor plate 5, and the Hall probe 4 is mounted in said opening.

The Hall device 4 has a pair of terminals 22 and 23 (FIGS. 5, 6 and 7) which are printed on the conductor plate 5, thereby eliminating the need for electrical connectors. The conductor plate 5 is held in position in the housing 13 by any suitable means such as, for example, a lid or cover 24 (FIGS. 3 and 4). The cover 24 may be removably affixed to the housing 13 by any suitable means such as, for example, bolts 25 (FIG. 4). A pair of projections 26 and 27 (FIGS. 3 and 5) extend from the cover 24 into corresponding openings, one of which is formed in the housing 13 and the other of which is formed in the conductor plate 5, in order to maintain said conductor plate in its proper position, especially its radial position. A connector plug 28 (FIGS. 3, 4 and 5) is provided on the conductor plate 5 for providing electrical energy from an outside power supply to the Hall device 4.

In order to decrease the volume occupied by the pulse generator of the present invention, the end of the shaft 1 in the housing 13 may be magnetized instead of affixing the permanent magnet 16 to such end. The output signals or Hall voltage pulses produced by the Hall device 4 are proportional in number to the length of the yarn, thread, or the like in contact with the yarn wheel 10. The Hall voltage pulses may then be supplied to a counter or similar device for indicating their number and thereby indicating the length of the yarn.

While the invention has been described by means of specific examples and in a specific embodiment, I do not wish to be limited thereto, for obvious modifications will occur to those skilled in the art without departing from the spirit and scope of the invention.

I claim:

1. An electronic pulse generator for producing a number of pulses proportional to the angle of rotation of a shaft, said pulse generator comprising magnetic means on said shaft and rotating therewith for producing a magnetic field, said magnetic means being radially magnetized in a manner whereby the field lines of said magnetic field emerge from said magnetic means substantially radially from said shaft;

a fixed conductor plate;

a Hall probe fixedly mounted on said conductor plate adjacent said magnetic means in said magnetic field; and ferromagnetic baffle sheets for directing said magnetic field to said Hall probe, said baffle sheets being affixed to said conductor plate.

2. An electronic pulse generator as claimed in claim 1, further comprising a printed circuit on said conductor plate electrically connected to said Hall probe.

3. An electronic pulse generator as claimed in claim 1, wherein said magnetic means is magnetized in the shape of an arc in a manner whereby the field lines of said magnetic field emerge from said magnetic means approximately coaxially with said shaft.

4. An electronic pulse generator as claimed in claim 1, further comprising an outside power connection for said Hall probe electrically connected to said Hall probe and mounted on said conductor plate.

5. An electronic pulse generator as claimed in claim 1, wherein said ferromagnetic baffle sheets have a specific configuration and said conductor plate and baffle sheets comprise cooperating means for mounting said baffle sheets in a manner whereby they retain their configuration.

6. An electronic pulse generator as claimed in claim 1, wherein each of said ferromagnetic baffle sheets comprises a sheet metal member bent at an angle.

7. An electronic pulse generator as claimed in claim 1, further comprising a housing housing said shaft, said conductor plate, said Hall probe and said baffle sheets.

8. An electronic pulse generator as claimed in claim 7, wherein part of said shaft extends outside said housing, and further comprising a peripherally notched yarn wheel coaxially affixed to said shaft outside said housing for rotation with said shaft and a bulging flange formed in said housing adjacent and extending under the periphery of said yarn wheel.

References Cited

UNITED STATES PATENTS

| 2,512,325 | 6/1950 | Hansen | 310—68 |
| 3,309,642 | 3/1967 | Grancoin | 310—10 X |

DAVID X. SLINEY, Primary Examiner

U.S. Cl. X.R.

338—32